United States Patent [19]

Spaziante et al.

[11] 4,215,009

[45] Jul. 29, 1980

[54] PURIFICATION METHOD

[75] Inventors: Placido M. Spaziante, Lugano, Switzerland; Luigi Giuffre; Aldo Castoldi, both of Milan, Italy; Giancarlo Sioli, Cernobbio, Italy

[73] Assignee: Oronzio deNora Impianti Elettrochimici S.p.A., Milan, Italy

[21] Appl. No.: 940,273

[22] Filed: Sep. 7, 1978

[30] Foreign Application Priority Data

Jun. 2, 1978 [IT] Italy ................................ 24141 A/78

[51] Int. Cl.$^2$ ..................... B01D 11/02; B01D 17/00
[52] U.S. Cl. ..................................... 252/184; 210/21; 210/24; 210/30 R; 252/364; 423/157
[58] Field of Search ...................... 252/184, 426, 364; 210/21, 24, 30 R, 37 R, 38 R; 423/157

[56] References Cited

U.S. PATENT DOCUMENTS

| | | | |
|---|---|---|---|
| 3,449,088 | 6/1969 | Lee | 423/157 |
| 3,490,880 | 1/1970 | Charlesworth | 423/157 |
| 3,514,266 | 5/1970 | Nichols et al. | 423/157 |
| 4,116,857 | 9/1978 | Lee et al. | 252/184 |
| 4,116,858 | 9/1978 | Lee et al. | 252/184 |

OTHER PUBLICATIONS

Zief et al., "Ultrapurity", Dekker, 1972, p. 15.
Int. J. of App. Rad. & Iso., 1969, vol. 20, pp. 135–139.
Chem. Abstracts, Amer. Chem. Soc., vol. 80, 1974, N0. 125379p.
Chem. Abstracts, Amer. Chem. Soc., vol. 83, 1975, No. 85639b.

Primary Examiner—Benjamin R. Padgett
Assistant Examiner—Irwin Gluck
Attorney, Agent, or Firm—Hammond & Littell, Weissenberger and Muserlian

[57] ABSTRACT

A novel method of reducing metal impurities in aqueous alkali metal halide solutions, especially alkaline earth metal ions, and to novel organic solvent compositions having a synergistic activity for removal of metal impruties from aqueous solutions.

19 Claims, No Drawings

PURIFICATION METHOD

STATE OF THE ART

The presence of calcium and magnesium ions in alkali metal halide brines for the electrolytic production of halogens such as chlorine presents well-known problems and therefore, the said ions are usually removed in chlorine plants equipped with mercury cells. While asbestos diaphragm cells can tolerate higher levels of impurities such as calcium and magnesium ions in the electrolyte, pretreatment of the brines is often effected.

Among the problems in electrolytic processes caused by the presence of calcium and magnesium ions are hydrogen evolution at the mercury cathode, mercury butter formation, fouling of cathodes and loss of current efficiency. Such effects are reversible and the electrolytic processes can normally tolerate calcium and magnesium impurities up to 5 to 10 mg/l without any practical negative results.

The recently introduced ion-exchange resin membrane electrolysis cells have several advantages over the mercury cathode and percolating diaphragm electrolysis cells and increasing use of membrane cells, particularly for chlorine cells, is forseen in the future. However, membrane cells have highlighted brine purification problems since the calcium ion and magnesium ion content has to be reduced as close to zero as possible. Instead of the negative effect on current efficiency and cathode fouling which occurs in the diaphragm and mercury cathode cells, these ions cause a substantially irreversible poisoning of the cationic membrane.

pH conditions occur inside the membranes per se which cause the formation of calcium and magnesium salts which precipitate and block the ion-exchange sites inside the membrane. This causes a rapid poisoning of the ionic selectivity of the membrane which causes the cell voltage to rise and the current efficiency to fall. Moreover, mechanical and electrical stresses may occur due to localization of calcium and magnesium complexes, particularly in higher current density areas, which causes irreversible distortions of the membrane. To date, attempts to regenerate posioned membranes of this nature have been unsuccessful and due to the high cost of the membranes, their life time of usefulness is one of the most important factors in the economical usefulness of these cells. Therefore, the removal of calcium and magnesium ions from alkali metal brines is becoming an even greater problem.

The traditional method of brine purification has been effected by adding sodium hydroxide and sodium carbonate to the brine to precipitate impurities in the form of their insoluble carbonates and hydroxides such as $Mg(OH)_2$ and $CaCO_3$ and the brine is then subjected to fluocculation and decantation and filtration to remove the salts. However, such a process is not useful for brine treatment for membrane electrolysis cells since the calcium and magnesium ion content is still too high to be tolerated by the membrane.

On a laboratory scale, sodium chloride has been precipitated from brine in a substantially pure form and then is redissolved in water but this is not suitable on a commercial scale. Impure brine has also been treated with ion-exchange resins to obtain a total calcium and magnesium ion concentration of about 0.5 mg/l but this method is too expensive for commercial operation since the said concentration is only reached after a large number of cycles.

Spanish Pat. No. 444,534 proposes the purification of brines by a two stage liquid-liquid extraction wherein brine is first contacted with an organic solvent phase containing a chelating agent such as di-(2-ethylhexyl)-phosphoric acid and a second promoter such as an alkylphosphoric acid ester, phosphine oxide or alkanol to obtain a purified aqueous brine and an organic phase containing the impurities which is then acid washed to remove the impurities as water-soluble salts such as calcium chloride, ferric chloride or magnesium chloride. However, the brine still has a calcium and magnesium ion content of about 5 and 4 mg/l, respectively, which is still too high for membrane cells which require a calcium and magnesium ion content of less than 0.5 mg/l, preferably less than 0.2 mg/l.

OBJECTS OF THE INVENTION

It is an object of the invention to provide a novel liquid-liquid purification of alkali metal brines to reduce impurity content to a level acceptable for membrane cells as well as other electrolysis cells.

It is another object of the invention to provide novel organic liquids having a synergistic effect for the extraction of metal impurities from aqueous alkali metal halide brines such as sodium chloride, sodium bromide or sodium iodide.

These and other objects and advantages of the invention will become obvious from the following detailed description.

THE INVENTION

The novel process of the invention for the removal of metal ion impurities from aqueous alkali metal halide brines comprises contacting an aqueous alkaline alkali metal halide brine containing metal ion impurities with a water-immiscible organic solvent containing an effective amount of at least one complexing agent of the group consisting of 1-aryl-3-methyl-4-acyl-pyrazol-5-one wherein the acyl is derived from an organic carboxylic acid of 1 to 18 carbon atoms and a thenoyl-substituted keto compound and a complexing additive selected from the group consisting of trialkylphosphine oxides and trialkylphosphates.

Preferably, the 1-aryl-3-methyl-4-acyl-pyrazol-5-ones have the formula

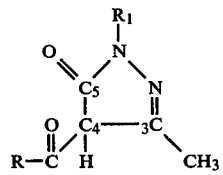

wherein RCO is an acyl of an organic carboxylic acid of 1 to 18 carbon atoms and $R_1$ is an aryl group, preferably a monocyclic aryl group such as phenyl, optionally substituted with at least one member of the group consisting of nitro, alkyl and alkoxy of 1 to 5 carbon atoms, halogen, $CF_3-$, $CF_3O-$ and $CF_3S-$.

The acyl radicals of organic carboxylic acids having from 1 to 18 carbon atoms are those of aliphatic or cycloaliphatic, saturated or unsaturated carboxylic acids or those of aromatic or heterocyclic carboxylic acids. For example, alkanoic acids such as formic acid, acetic acid, propionic acid, butyric acid, isobutyric acid, valeric acid, isovaleric acid, trimethylacetic acid, caproic acid, β-trimethylpropionic acid, oenantic acid, caprylic acid, pelargonic acid, capric acid, undecylic acid, lauric acid, myristic acid, palmitic acid, stearic acid; alkenoic acids such as undecylenic acid, oleic acid; cycloalkanoic acids, such as cyclopentyl, cyclopropyl, cyclobutyl and cyclohexyl carboxylic acids; cycloalkylalkanoic acids, such as cyclopropylmethyl carboxylic acid, cyclobutylmethyl carboxylic acid; cyclopentylethyl carboxylic acid, cyclohexylethyl carboxylic acid; phenylacetic or propionic acid; benzoic acid; phenoxyalkanoic acids, such as phenoxyacetic acid, p-chlorophenoxyacetic acid, 2,4-dichlorophenoxyacetic acid, 4-tertbutylphenoxyacetic acid, 3-phenoxypropionic acid, 4-phenoxybutyric acid; β-ketocarboxylic acids, such as acetylacetic acid, propionylacetic acid, butyrylacetic acid; alkylene polycarboxylic acids, such as succinic acid, adipic acid, citric acid; sulfobenzoic acids, such as m-sulfobenzoic acid, etc.

Examples of specific compounds of formula I are 1-phenyl-3-methyl-4-acetyl-pyrazol-5-one, 1-phenyl-3-methyl-4-propionyl-pyrazol-5-one, 1-phenyl-3-methyl-4-butyrylpyrazol-5-one, 1-phenyl-3-methyl-4-chloroacetyl-pyrazol-5-one, 1-phenyl-3-methyl-4-ethoxycarbonyl-pyrazol-5-one, 1-phenyl-3-methyl-4-p-bromobenzoyl-pyrazol-5-one, 1-phenyl-3-methyl-4-p-nitrobenzoyl-pyrazol-5-one, 1-phenyl-3-methyl-4-trifluoroacetyl-pyrazol-5-one, 1-phenyl-3-methyl-4-capronyl-pyrazol-5-one, 1-phenyl-3-methyl-4-benzoyl-pyrazol-5-one, 1-phenyl-3-methyl-4-p-chlorobenzoyl-pyrazol-5-one, and 1-p-nitrophenyl-3-methyl-4-benzoyl-pyrazol-5-one.

Preferably, the thenoyl substituted keto compounds of the invention have the formula

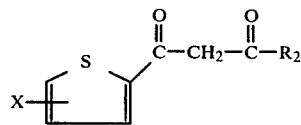

II wherein $R_2$ is a carbonyl activating group and X is selected from the group consisting of hydrogen, halogen and alkyl and alkoxy of 1 to 5 carbon atoms. Example of carbonyl activating groups is $CR_mY_n$, wherein R is H—, $C_6H_5$—; Y is F, Cl, Br; m is 0, 1, 2 and n is 3, 2, 1. The preferred compound is thenoyl-trifluoroacetone (4.4.4 trifluoro-1-(2-thienyl)-butan-1,3-dione) but also useful is thenoyl-difluorophenylacetone (4phenyl-4,4-difluoro-1-(2thienyl)-butan-1,3dione).

Examples of the complexing additives are trialkyl phosphine oxides of 1 to 10 alkyl carbon atoms and trialkyl phosphates of 1 to 10 alkyl carbon atoms. Examples of specific compounds are tri-n-octrylphosphine oxide and tributylphosphate. The said additives have to be soluble in the water-immiscible organic solvent.

Examples of suitable water-immiscible organic solvents are aromatic hydrocarbons such as toluene, xylene and benzene, oxygenated hydrocarbons such as cyclohexanone, alkanols such as amyl alcohols, chlorinated hydrocarbons such as carbon tetrachloride and hydrocarbons such as kerosene which is preferred due to its low cost and low toxicity. Moreover kerosene does not form emulsions with aqueous alkali metal halide brines over a wide pH range.

The concentration of the complexing agent my vary over a wide range up to saturation in the organic solvent. Preferably, the concentration may be from 0.1 to 0.001 M and while more dilute solutions may be used, these generally require a greater number of extraction steps. The complexing additive concentration may also vary over a wide range up to saturation but the preferred concentration is 0.1 to 5% by volume.

The compositions of the invention have a surprising complexing power for metallic ions in alkaline aqueous alkali metal halide brines greater than that obtained with individual components. The calcium and magnesium ion content in a brine containing 300 to 310 g/l of sodium chloride can be reduced to less than 0.2 mg/l which is a concentration so low as not to be detectable with the most sensitive analysis instruments.

The synergistic effects have been demonstrated by tests with an organic solution of the complexing additive alone which has substantially no effect on metal ion concentration, an organic solution of the complexing agent alone which has some reducing effect on the metal ion concentration and an organic solution of both which has a greatly increased activity.

The aqueous alkali metal halide brine must have an alkaline pH, preferably in the range of 10.5 to 12, before contact with the organic solution. During the extraction step, the pH is reduced until it becomes slightly acid so the higher pH values are preferred. Beginning with a brine with a pH of 11, the pH value will drop to about 6 after contact with the organic acid solution. A compromise between the stability of the calcium and magnesium complexes formed and the water solubility of the chelating agent is achieved under these conditions. At a pH of 6, the water solubility of the chelating agents is negligible and will diminish in a more acid pH.

The alkalinity of the brine may be adjusted before each extraction step by addition of a suitable base such as alkali metal hydroxides like sodium hydroxide.

After the extraction step, the organic solution is treated with an aqueous strong acid such as hydrochloric acid which will remove the metal impurities therefrom as calcium chloride and magnesium chloride in the aqueous phase. The organic phase can then be recycled for additional extractions. Other acids such as sulfuric acid, nitric acid or phosphoric acid may also be used as long as the calcium and magnesium salts thereof are water soluble.

The volume ratio of the aqueous alkali metal halide solution and the organic solution may vary between wide limits depending on the method of contact between the two phases, the time of said contact and the density ratio of aqueous phase/organic phase. The said volume ratio may be 1 to 1 to 10 to 1, preferably 1 to 1 to 5 to 1. Contact between the two phases may be achieved by any suitable means such as mechanical stirrers, centrifuges and packed columns and plate columns.

After the extraction stage, the two stages may be separated by any suitable means such as decantation and then the organic phase is extracted with an aqueous acid in a similar manner such as mechanical stirring, etc. The organic phase is then recycled to the brine extraction stage and the process may be a simple extraction or may be a plurality of cycles.

In a preferred mode of the process, the raw brine which may contain as high as 160 mg/l of calcium ions, 100 mg/l of magnesium ions and 10 mg/l of iron ions is first subjected to the traditional technique of flocculation, decantation and filtration to reduce the metal ion content and the brine is then subjected to the extraction process of the invention to reduce the calcium and magnesium content to less than 0.2 mg/l, usually in a single extraction.

In the following examples there are described several preferred embodiments to illustrate the invention. However, it is to be understood that the invention is not intended to be limited to the specific embodiments.

EXAMPLE 1

A series of purification tests were run with an aqueous brine containing 300 g/l of sodium chloride, 13.5 mg/l of calcium ions and 10 mg/l of magnesium ions and the organic extract was kerosene to which the additives of Table I were added. The pH of the brine was adjusted to 11.5 to 12 with sodium hydroxide solution before each extraction and the volume ratio of the organic phase to aqueous phase was 1:1 to 0.5:1. The extractions were carried out by stirring at 25°-30° C. for up to 5 minutes and after each extraction stage, the amount of calcium and magnesium ions in the brine was determined with the results being reported in Table I.

The organic phase was then separated from the aqueous brine phase and was then stirred with an equal volume of 18% hydrochloric acid for 5 minutes to remove calcium and magnesium ions therefrom. The organic phase was then decanted, separated and used for the next extraction. The results are reported in Table I. TTA indicates thenoy trifluoroacetone which has the formula

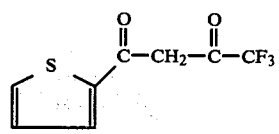

and PMBP is 1-phenyl-3-methyl-4-benzoyl-pyrazol-5-one which has the formula

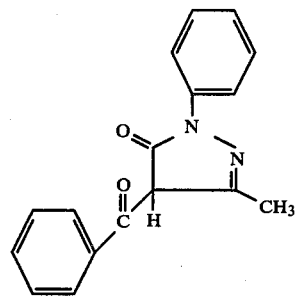

TOPO is trioctylphosphine oxide and TBP is tributyl phosphate.

TABLE I

| Complexing agent | Concentration in molarity | Additive | Additive Concent. in % by Weight | No. of Extraction cycles | Content of Ca++ (mg/l) | Content of Mg++ (mg/l) |
| --- | --- | --- | --- | --- | --- | --- |
| TTA | 0.05 | — | — | 1 | 8 | 5 |
|  |  |  |  | 2 | 6 | 1 |
|  |  |  |  | 3 | 4.5 | 0.5 |
| PMBP | 0.05 | — | — | 1 | 7.5 | 6 |
|  |  |  |  | 2 | 4 | 1.2 |
|  |  |  |  | 3 | 2.8 | 0.5 |
| — | — | TOPO | — | 1 | 13.1 | 10 |
| — | — | TBP | — | 1 | 13.5 | 9.8 |
| TTA | 0.001 | TOPO | 0.2 | 1 | 1.5 | 0.8 |
|  |  |  |  | 2 | <0.2 | <0.2 |
| TTA | 0.001 | TBP | 0.2 | 1 | 1.3 | 0.6 |
|  |  |  |  | 2 | <0.2 | <0.2 |
| PMBP | 0.001 | TOPO | 0.2 | 1 | 1.1 | 0.6 |
|  |  |  |  | 2 | <0.2 | <0.2 |
| PMBP | 0.001 | TBP | 0.2 | 1 | 1.2 | 0.5 |
|  |  |  |  | 2 | <0.2 | <0.2 |
| PMBP | 0.01 | TOPO | 2 | 1 | <0.2 | <0.2 |
| TTA | 0.01 | TOPO | 2 | 1 | <0.2 | <0.2 |

The results of Table I clearly show the synergistic effect of the compositions of the invention. When the complexing agents are used alone, even at the relatively high concentration of 0.05 M, the content of calcium and magnesium ions after 3 extractions is only reduced to 3 and 0.5 mg/l, respectively while after only two extractions with a complexing agent concentration of 0.001 M plus the additive, the concentration of calcium and magnesium ions are both reduced below the limit of 0.2 mg/l which is the sensitivity limit of the analytical apparatus used. When the complexing agent is used at a concentration of 0.01 M plus the additive, a single extraction reduce the calcium and magnesium ion contents to less than 0.2 mg/l.

EXAMPLE 2

An aqueous brine containing 300 g/l of sodium chloride, 185 mg/l of calcium ions and 50 mg/l of magnesium ions was extracted as in Example 1 with kerosene containing PMBP 0.01 M and 2% by weight of trioctylphosphine oxide. After a single extraction, the calcium and magnesium ion contents were 3 and 2 mg/l, respectively. After a second extraction, the calcium and magnesium ion contents were both below the sensitivity level of 0.2 mg/l.

EXAMPLE 3

The test of Example 2 was repeated except the brine further contained 50 mg/l of active chlorine to determine the resistance of the complexing agent and additive to the presence of active chlorine in the solution. After 30 extractions cycles, the ability of the kerosene mixture to extract calcium and magnesium ions was unchanged.

EXAMPLE 4

The following test was conducted to demonstrate the difference between the compositions of the invention and those of Spanish Pat. No. 444,534. An aqueous brine containing 300 g/l of sodium chloride, 100 mg/l of calcium ions and 100 mg/l of magnesium ions was extracted once with a kerosene solution containing PMBP 0.01 M and 2% by weight of trioctylphosphine oxide and a kerosene solution containing 2% by weight of di-(2-ethylhexyl)-phosphoric acid and 2% by weight of tributylphosphate and the results are reported in Table II.

TABLE II

| Extractant | Content in mg/l of | |
|---|---|---|
| | $Ca^{++}$ | $Mg^{++}$ |
| PMBP & Trioctyl-phosphine oxide | <0.2 | <0.2 |
| di-(2-ethylhexyl)-phosphoric acid & tributylphosphate | 11 | 19 |

The results of Table II clearly show that the process of the invention is superior to the prior art process.

Various modifications of the compositions and process of the invention may be made without departing from the spirit or scope thereof and it should be understood that the invention is intended to be limited only as defined in the appended claims.

What is claimed:

1. A process for reducing metal ion concentration in aqueous alkali metal halide brines to a level below 0.2 mg/l comprising contacting an aqueous alkaline alkali metal halide brine having a pH of 10.5 to 12 and containing metal ion impurities with a water-immiscible organic solvent containing an effective amount of at least one complexing agent of the group consisting of 1-aryl-3-methyl-4-acylpyrazol-5-one wherein the acyl is derived from an organic carboxylic acid of 1 to 18 carbon atoms and a thenoyl-substituted keto compound and a complexing additive selected from the group consisting of trialkylphosphine oxides and trialkylphosphates.

2. The process of claim 1 wherein the complexing agent has the formula

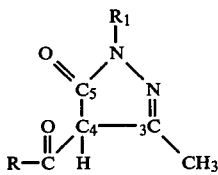

wherein RCO is an acyl of an organic carboxylic acid of 1 to 18 carbon atoms and $R_1$ is an aryl group.

3. The process of claim 2 wherein the complexing agent is selected from the group consisting of 1-phenyl-3-methyl-4-acetyl-pyrazol-5-one, 1-phenyl-3-methyl-4-propionyl-pyrazol-5-one, 1-phenyl-3-methyl-4-butyryl-pyrazol-5-one, 1-phenyl-3-methyl-4-chloroacetyl-pyrazol-5-one, 1-phenyl-3-methyl-4-ethoxycarbonyl-pyrazol-5-one, 1-phenyl-3-methyl-4-p-bromobenzoyl-pyrazol-5-one, 1-phenyl-3-methyl-4-p-nitrobenzoyl-pyrazol-5-one, 1-phenyl-3-methyl-4-trifluoroacetyl-pyrazol-5-one, 1-phenyl-3-methyl-4-capronyl-pyrazol-5-one, 1-phenyl-3-methyl-4-benzoyl-pyrazol-5-one, 1-phenyl-3-methyl-4-p-chlorobenzoyl-pyrazol-5-one and 1-p-nitrophenyl-3-methyl-4-benzoyl-pyrazol-5-one.

4. The process of claim 1 wherein the complexing agent has the formula

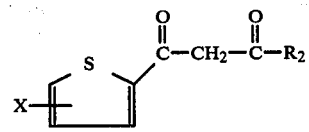

wherein $R_2$ is a carbonyl activating group and X is selected from the group consisting of hydrogen, halogen and alkyl and alkoxy of 1 to 5 carbon atoms.

5. The process of claim 1 wherein the complexing agent is thenoyl-trifluoroacetone.

6. The process of claim 1 wherein the complexing additive is selected from the group consisting of trialkylphosphates and trialkylphosphine oxides.

7. The process of claim 1 wherein the complexing additive is selected from the group consisting of tri-n-octylphosphine oxide and tributylphosphate.

8. The process of claim 1 wherein the organic solvent is selected from the group consisting of kerosene, benzene, toluene, xylene, carbon tetrachloride, amylalcohol and cyclohexane.

9. The process of claim 1 wherein the concentration of the complexing agent is 0.1 to 0.001 molar.

10. The process of claim 1 wherein the complexing agent is 1-phenyl-3-methyl-4-benzoyl-pyrazol-5-one.

11. A composition for reducing metal ion content of aqueous alkaline solutions comprising a solution of an water-immiscible organic solvent containing (a) 0.1 to 0.001 M of at least one complexing agent of the group consisting of 1-aryl-3-methyl-acyl-pyrazol-5-one wherein the acyl is derived from an organic carboxylic acid of 1 to 18 carbon atoms and a thenoyl-substituted keto compound and (b) 0.1 to 5% by volume of a complexing additive selected from the group consisting of trialkyl phosphine oxides and trialkylphosphates.

12. The composition of claim 11 wherein the complexing agent has the formula

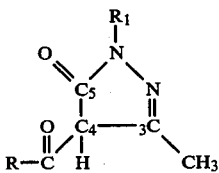

wherein RCO is an acyl of an organic carboxylic acid of 1 to 18 carbon atoms and $R_1$ is an aryl group.

13. The composition of claim 11 wherein the complexing agent is selected from the group consisting of 1-phenyl-3-methyl-4-acetyl-pyrazol-5-one, 1-phenyl-3-methyl-4-propionyl-pyrazol-5-one, 1-phenyl-3-methyl-butyryl-pyrazol-5-one, 1-phenyl-3-phenyl-4-chloroacetyl-pyrazol-5-one, 1-phenyl-3-methyl-4-ethoxycarbonyl-pyrazol-5-one, 1-phenyl-3-methyl-4-p-bromobenzoyl-pyrazol-5-one, 1-phenyl-3-methyl-4-p-nitrobenzoyl-pyrazol-5-one, 1-phenyl-3-methyl-4-trifluoroacetyl-pyrazol-5-one, 1-phenyl-3-methyl-4-capronyl-pyrazol-5-one, 1-phenyl-3-methyl-4-benzoyl-pyrazol-5-one, 1- phenyl-3-methyl-4-p-chlorobenzoyl-pyrazol-5-one and 1-p-nitrophenyl-3-methyl-4-benzoyl-pyrazol-5-one.

14. The composition of claim 11 wherein the complexing agent has the formula

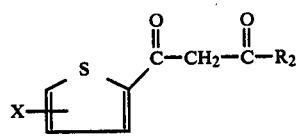

wherein $R_2$ is a carbonyl activating group and X is selected from the group consisting of hydrogen, halogen and alkyl and alkoxy of 1 to 5 carbon atoms.

15. The composition of claim 11 wherein the complexing agent is thenoyl-trifluoroacetone.

16. The composition of claim 11 wherein the complexing additive is selected from the group consisting of trialkylphosphates and trialkylphosphine oxides.

17. The composition of claim 11 wherein the complexing additive is selected from the group consisting of tri-n-octylphosphine oxide and tributylphosphate.

18. The composition of claim 11 wherein the organic solvent is selected from the group consisting of kerosene, benzene, toluene, xylene, carbon tetrachloride, amylalcohol and cyclohexane.

19. A composition consisting essentially of kerosene containing 0.1 and 0.001 moles of a member selected from the group consisting of thenoyl trifluoracetone and 1-phenyl-3-methyl-4-benzoyl-pyrazol-5-one and 0.1 to 5% by volume of a member of the group consisting of tributylphosphate and tri-n-octylphosphine oxide.

* * * * *